United States Patent
Rosenthal et al.

(10) Patent No.: US 12,307,506 B2
(45) Date of Patent: May 20, 2025

(54) METHOD FOR MANAGING DATA ASSETS IN AN ENTERPRISE DATA MARKETPLACE

(71) Applicants: Alex Rosenthal, Syosset, NY (US); Daniel Johnson, Slingerlands, NY (US); Jennifer Dieter, Allentown, PA (US); Wang Cheung, Astoria, NY (US); Ashutosh Khandekar, North Brunswick, NJ (US); Prathamesh Jagtap, Jersey City, NJ (US)

(72) Inventors: Alex Rosenthal, Syosset, NY (US); Daniel Johnson, Slingerlands, NY (US); Jennifer Dieter, Allentown, PA (US); Wang Cheung, Astoria, NY (US); Ashutosh Khandekar, North Brunswick, NJ (US); Prathamesh Jagtap, Jersey City, NJ (US)

(73) Assignee: Guardian Life Insurance Company of America, New York, NY (US)

( * ) Notice: Subject to any disclaimer, the term of this patent is extended or adjusted under 35 U.S.C. 154(b) by 590 days.

(21) Appl. No.: 15/814,978

(22) Filed: Nov. 16, 2017

(65) Prior Publication Data

US 2018/0330428 A1 Nov. 15, 2018

Related U.S. Application Data

(63) Continuation-in-part of application No. 15/637,758, filed on Jun. 29, 2017, now abandoned.

(Continued)

(51) Int. Cl.
*G06Q 30/06* (2023.01)
*G06Q 30/0601* (2023.01)
*H04L 9/40* (2022.01)

(52) U.S. Cl.
CPC ..... *G06Q 30/0641* (2013.01); *G06Q 30/0613* (2013.01); *G06Q 30/0623* (2013.01);
(Continued)

(58) Field of Classification Search
CPC . G06Q 30/06; G06Q 30/0641; G06Q 30/0613
(Continued)

(56) References Cited

U.S. PATENT DOCUMENTS

| | | | |
|---|---|---|---|
| 7,912,971 B1* | 3/2011 | Dunn | H04L 63/102 726/28 |
| 2006/0218148 A1* | 9/2006 | Weber | G06F 16/41 707/999.009 |
| 2014/0324981 A1* | 10/2014 | Cropper | H04L 65/4084 709/204 |

OTHER PUBLICATIONS

Rizvi, S. Z. R. (2015). ReBAC2015: Interoperability of relationship- and role-based access control (Order No. 10630481). Available from ProQuest Dissertations and Theses Professional. (1923428676). Retrieved from https://dialog.proquest.com/professional/docview/1923428676?accountid=131444.*

* cited by examiner

*Primary Examiner* — Jeffrey A. Smith
*Assistant Examiner* — Jennifer V Lee
(74) *Attorney, Agent, or Firm* — Danielle C. Sullivan; Carter, Ledyard & Millbum LLP

(57) ABSTRACT

A system and method for a centralized data asset marketplace including a single network or cloud platform environment for the sharing and distribution of data assets, a user interface layer providing a user access to the environment, data assets, an access control and audit component which stores user's requests and a single sign on component allowing the user to access the user interface layer, wherein the user interface layer includes a meta data management component, a service discovery component, a service (Continued)

request processing component, and a delivery service. The method of managing data assets includes registering of data assets, wherein the registering of the data assets includes registering meta data of the data assets; accessing and execution of data assets; searching for data assets, wherein the searching can be via a pre-configured search or custom created search queues; sharing of data assets, wherein the sharing of the data assets can be done for the corresponding meta data or of actual results of the data asset; checking out data assets, wherein checking out of the data assets includes adding the assets to a shopping cart; and authorization for selective execution of the data assets.

20 Claims, 11 Drawing Sheets

Related U.S. Application Data

(60) Provisional application No. 62/356,809, filed on Jun. 30, 2016.

(52) U.S. Cl.
CPC ..... *G06Q 30/0631* (2013.01); *H04L 63/0815* (2013.01); *H04L 2463/101* (2013.01)

(58) Field of Classification Search
USPC .............................................. 705/26.1–27.2
See application file for complete search history.

| | ENTERPRISE DATA MARKETPLACE | | | Welcome Alex Rosenthal | Contact Us  Help | |
|---|---|---|---|---|---|
| HOME  MY DATA  ADMIN | | | | Search | 12 |
| MY DATA | | | | | ADD TO CART |
| Data Service Name | 01 Manager Transaction Report | | | | 2 |
| Data Service Description | | | | | |
| Data Definition | DATA DICTIONARY —14 | | | | |
| Ratings | ☆☆☆☆☆ (0 Ratings) | Entitled users | 0 | | |
| Data Classification | Internal | Publisher | ACT ODS | | |
| Data Owner | Data | DataCategory | | | |
| Refresh Frequency | On Demand | Delivery Format | URL in Business Objects Report Format | | |
| Original Registration Date | '201-07-06 00:00:00 | Last Refresh Date | '2016-02-29 11:05:47.0 | | |
| Registry ID | 1089 | Data Asset Group | ACT ODS (11) | | |
| Tags | Distribution Internal Source, ACT ODS, Report/Dashboard, Business Objects Report, Internal In Demand, Production. | | | | |

| 0 | 0 | 0 | 0 | 0 | 0 |
|---|---|---|---|---|---|
| ☆☆☆☆☆ | ☆☆☆☆☆ | ☆☆☆☆☆ | ☆☆☆☆☆ | ☆☆☆☆☆ | ☆☆☆☆☆ |
| LAWS Activity Detail | LAWS Activity Detail by Key | LAWS Activity Report | LAWS Activity Report Daily | LAWS Activity Report New | LAWS Activity Report New1 |
| Business Unit distribution | Business Unit distribution | Business Unit distribution | Business Unit distribution | Business Unit distribution | Business Unit distribution |
| Publish IL ACT ODS | Publish IL ACT ODS | Publish IL ACT ODS | Publish IL ACT ODS | Publish IL ACT ODS | Publish IL ACT ODS |
| Asset Type Report/Dashboard | Asset Type Report/Dashboard | Asset Type Report/Dashboard | Asset Type Report/Dashboard | Asset Type Report/Dashboard | Asset Type Report/Dashboard |

METHOD FOR MANAGING DATA ASSETS IN AN ENTERPRISE DATA MARKETPLACE

This application a Continuation in Part of the U.S. patent application Ser. No. 15/637,758, filed Jun. 30, 2017, entitled "ENTERPRISE DATA MARKETPLACE SYSTEM AND METHOD," which claims priority to U.S. Provisional Patent Application No. 62/356,809 filed Jun. 30, 2016, entitled "DATA MARKETPLACE" and are hereby incorporated by reference in its entirety.

FIELD OF THE INVENTION

The present invention relates to a data marketplace, more specifically a central hub for sharing, distributing, and tracking data assets.

SUMMARY OF THE INVENTION

This present invention provides a platform that allows for the registration of, searching of, sharing of, checking out of, charging for, accessing of, execution of, scheduling of, scoring of and commenting on data assets. Data assets can include any digital sharing such as reports, file downloads, data services (e.g. Representational State Transfer, also known as REST), micro services, applets, etc.

The present invention provides a system for a centralized data asset marketplace including a single network or cloud platform environment for the sharing and distribution of data assets, a user interface layer providing a user access to the environment, data assets, an access control and audit component which stores user's requests and a single sign on component allowing the user to access the user interface layer, wherein the user interface layer includes a meta data management component, a service discovery component, a service request processing component, and a delivery service.

The present invention also provides a method for managing data assets via a networked system including managing first party and third party data assets on a single platform; registering of data assets, wherein the registering of the data assets includes registering meta data of the data assets and storing in a meta database, wherein the data assets are continuously read and updated on the meta database and the data assets are cataloged by a data steward, the data steward registering meta data and tag services; maintaining ownership responsibility of each data asset by a data asset owner; providing a user self-service access to the data assets; authorizing access to a user interface layer using a single sign on browser request, wherein a user ID is checked against an organizations directory; upon user browser authorization, determining a type of user authorized to use the user interface layer; opening a graphical interface for the user based on the user type; searching for data assets; submitting a request for data asset authorization if a data asset selected by a user; authorizing data asset execution based on approved data asset authorization requests and delivering the data asset to approved users.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 8 shows a screen shot of the "Data Asset Detail" screen;
FIG. 9 shows a screen shot of the "Shopping Cart" screen;
FIG. 10 shows a screen shot of the "My Data Section" screen;
and
FIG. 11 shows a screen shot of the "Administrative Section for Data Assets" screen.

DETAILED DESCRIPTION

The Enterprise Data Marketplace Platform (EDM) is a centralized web based application for insurance and other data services and reports providing a virtual and physical hub and shopping experience for data assets. (Data services include any process and format by which information can be ascertained by the user, such as a query to a data source or running an application to open the assets in a particular format.) The marketplace offers a self-service model to provide advanced data capabilities to the enterprise, promote reusable data assets, reduce compliance risk with trusted secure data, reduce cost, and eliminate redundancy. Besides serving as a portal for self-service data access, the present invention also functions as a data service registry in which meta data of the data services are registered, data assets are scheduled and delivered, and user metrics are captured. The marketplace connects to a data abstraction layer. The data abstraction layer is an application (such as Denodo) which creates a virtual view around underlying disparate types of data and exposes them in the form of REST API's, for example. The data abstraction layer allows users to connect to disparate types of reports and data extracts throughout the organization.

The present invention provides multiple benefits including: the use of a single platform, the ability for data owners to maintain responsibility over their data asset, the ability to meter usage and the ability to socialize experiences. The data assets from a $1^{st}$ party and a $3^{rd}$ party are managed on a single platform. The $1^{st}$ party data is proprietary data that is needed and used internally for operational and analytical purposes. This is critical for following regulatory requirements such as the handling of Protected Health Information (PHI) and Personally Identifiable Information (PII). The $3^{rd}$ party data is data provided by a $3^{rd}$ party via different access mechanisms, such as an application programming interface (API), file transfer, or other known methods of computer-enabled data transfer. Data owners are given the ability to authorize, approve and monitor the user access of data assets they are responsible for. The ability to meter usage of internal and external data allows for a detailed cost to be charged back to the proper users and departments when desired. The ability to socialize one's experience with data assets with the community includes scoring the data assets as well as providing comments on the data assets.

Figure 1:
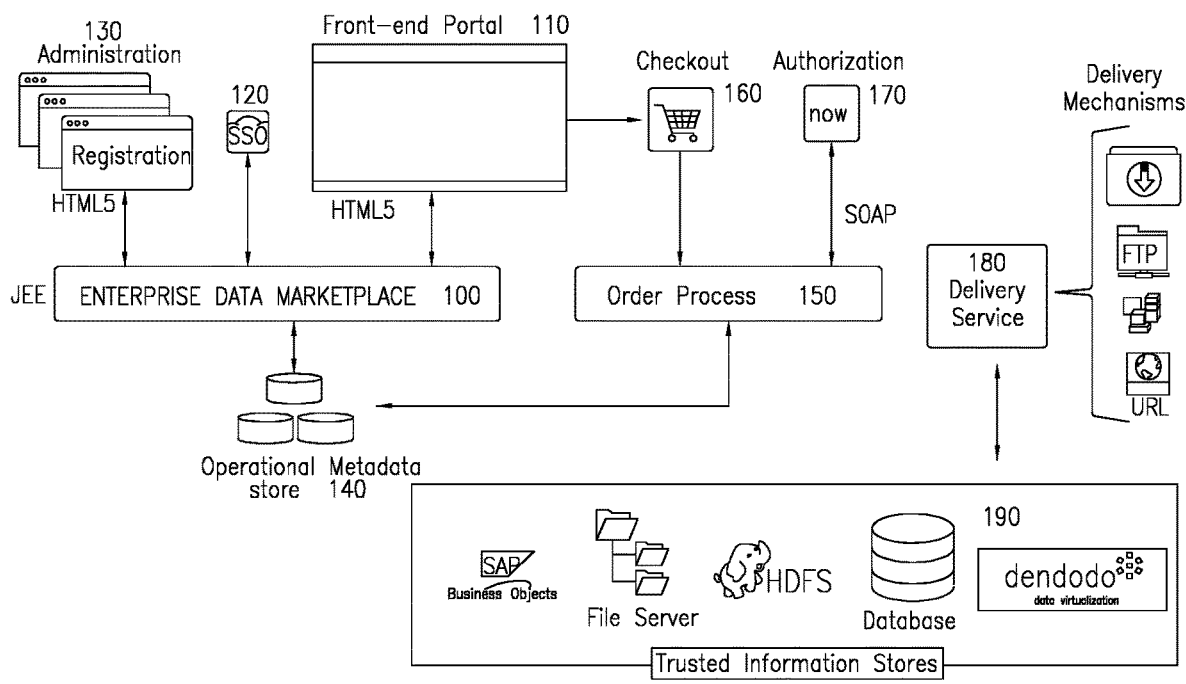
FIG. 1 shows the architecture of the present invention.

FIG. 1 shows the marketplace architecture and ecosystem. Enterprise data marketplace 100 is developed in Java with a backend database that stores the operational metadata 140 of the data services. Front end portal 110 renders HTML5 for the end users to browse, search and order data services. The end users are the business users that interact with the system to discover and request access to the data services available within the organization via front end portal 110. This is an EDM URL, a website application, on a web browser. The web browser is responsible for handling the http resources request and response. The EDM has a single sign on (SSO) component 120 which allows the EDM to identify the user. The business user's ID is received in the browser request and is authorized against the organization's user directory. The user ID will be passed on to the User Interface Layer. The User Interface Layer identifies the user as a business user or an EDM administrator. The business user is able to view the data assets, instances, services and the data dictionary which lists the asset attributes. The EDM administrator is allowed to create, update, and view the assets, instances, services and data dictionary. Once the type of user is identified, a graphical interface opens that is implemented as web pages open on the web browser. This comprises HTML files (for UI structuring), CSS (for styling) and Java script (for client-side business logic files).

Administration registration 130 is an administrative front end in which the data services are cataloged by data stewards who register the meta data and tag the services. Access related information is stored in an access control and audit store.

Meta Data Components read and update data to Meta Store 140. Service Meta Store 140 is a database that holds all of the catalog information of the data services available. It stores all the enlisted data assets, instances and services in the system. It also provides storage to all the service related attributes, for example the policy number, the claim date and/or the agency name, of each of the data services and the relations among them such as the party name, address, social security number and/or phone number. Meta Data Management acts as a serving layer for the Service Meta Store 140. While searching for a required data service, business users have access to read methods of the Meta Store 140. The service directory leverages the meta store information to help the users find services based on filters. Such filter capabilities include text search a service by name, description or data dictionary; search service by owner, or search service by a faceted search, for example a tag based search. Only the EDM administrators have permission to access the create and update capabilities of the data services of the Meta Store. The available operations to the administrative user include: creating, updating and deleting an asset, instance and service; managing the data dictionary of an asset; managing the owner of an asset; defining asset tags, asset status and the environment type of an asset; and defining the delivery method, connection configuration and input parameters of a service.

When the user selects a service and places it within their cart, they can check out by the user submitting a request for access by "Checkout." Upon checkout 160 of the data services, order processing 150 begins. During order processing 150 the application integrates with a provisions system 170 where an entitlements review is conducted by the data owner for approval. The service request processing component is responsible for translating the user request to the authorization systems 170 request format. The conversion depends on the authorization system used, as the format varies from system to system and therefore must be implemented separately for each authorization system. For example, using SOAP Web Service integration may be used to submit requests into the "Service Now." This request requires the following information: service name, service details, classification, owner service and requestor ID and name, for example. The service request processing is also responsible for being an interface to the access control and audit store and includes the following additional functionality: retrieving and returning approved, pending, rejected and inactive user requests; removing user access; and logging "add Access" and "remove access" to the audit store. The authorization system is responsible for communicating and following up with the service owners and getting approval for a service request. An interface is also provided for the enterprise data marketplace 100 to retrieve the status of a given ticket number.

Upon authorization, order processing 150 continues to delivery service 180. Delivery mechanisms includes FTP, URL redirect and file download. The data is then sourced from the meta store 140 for first party information or heterogeneous data stores 190 for $3^{rd}$ party data consumption. Data stores 190 are trusted information stores. The EDM is responsible for fetching raw data from a trusted information store and provisioning it to a business user in the requested format. If the data format in raw form differs from the requested format, the delivery service will handle the required transformation. Fetching may vary based on the information store and a fetcher may be built accordingly. Fetchers can include HDFS, Denodo, Business objects, Oracle or a file system. A generic interface allows the implementation of the system specific fetchers to provide flexibility. Once the user is authorized they are given access to the service data. The users may retrieve the service data via multiple forms including: a flat file, a reporting tool or a URL redirect. Using a flat file, the service data is downloaded onto the user's workstation in the form of a file. Using a reporting tool, the service data is fetched into a reporting tool using a custom connector. Using URL redirect, the service resides on a $3^{rd}$ server and the user is redirected to that server. Trusted information stores 190 are the $3^{rd}$ party applications and act as an information storage approved by an organization.

Figure 2:
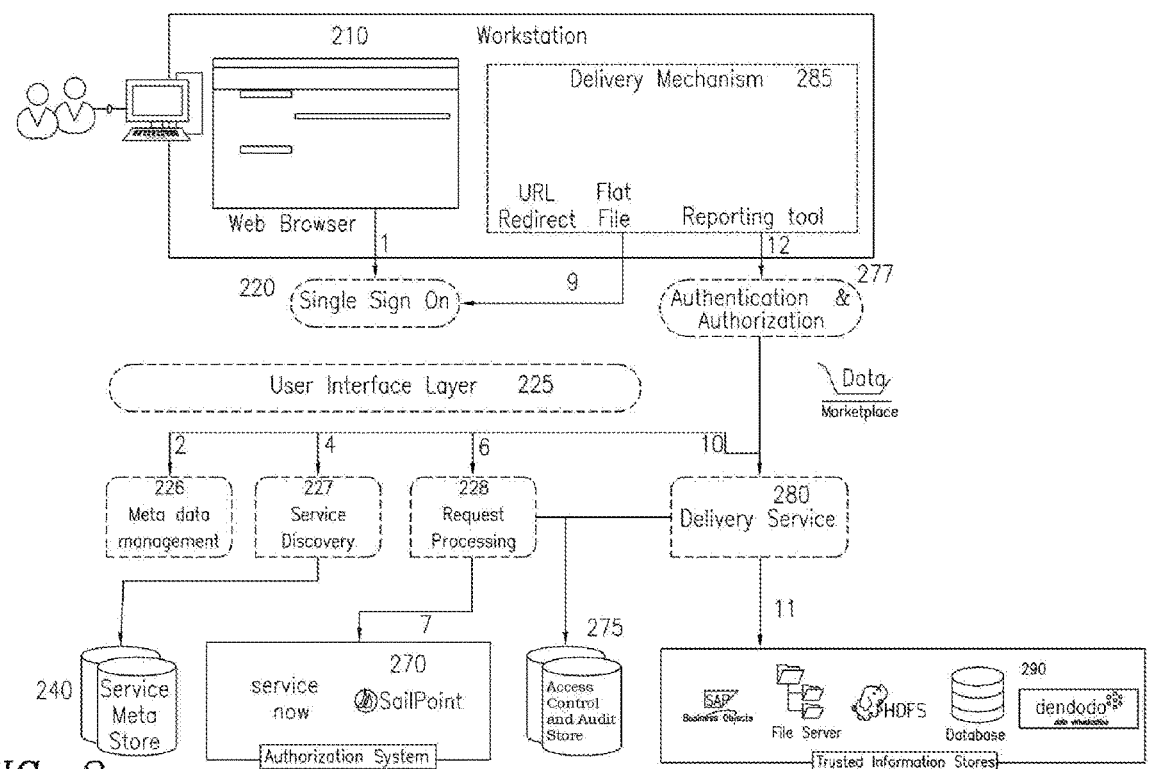
FIG. 2 shows an architecture flow chart of the present invention.

FIG. 2 shows an architecture flow chart of the present invention. User 205 goes to the EDM URL 210. EDM URL 210 is protected by SSO 220. User 205 will need to provide a User ID which will be passed on to the User Interface Layer (UI) 225. UI 225, via Meta Data Management 226, will identify the user as a business user or an EDM administrator. A business user is provided access allowing the user to view assets, instances, services and the data dictionary. An EDM administrative user is provided access allowing the user to create, update and view assets, instances, services and the data dictionary. Meta data component 226 also reads and updates the data assets to Service Meta Store 240. UI 225 identifies the user and allows user 205 to search by various methods via service discovery 227. Service discovery 227 uses meta store 240 to serve UI layer 225. Once user 205 requests an action such as "Add to cart," "Checkout," "Remove," or "List," the request is processed by service request processing component 228. Service request component 228 makes a web service request to an authorization system 270 along with the required authorization information. Authorization is done before the data service is provided to the user. The user is authorized by checking if the user is allowed access to the given data service. The request received from the user is sent and audited in Access Control and Audit store 275. Once the data access is provisioned (approved), the access is logged into Audit store 275. Once access to the data service is approved, user 205 makes a service data request through web interface 210 that leads to identification of the user based on SSO 220. UI layer 225 makes subsequent data request calls to delivery component 280. Delivery component 280 contacts trusted information store 290 to fetch the data. If a reporting tool does not support SSO 220, it goes to a $3^{rd}$ party authentication and authorization gateway 277 to identify the user. After which the UI will make the service data request to delivery component 280. The UI layer is responsible for getting/setting the Meta Data Information from Meta Data Management layer (the serving layer). This may be done over REST services for example. The Meta Data management layer is independent of the data abstraction and management layer.

Figure 3:
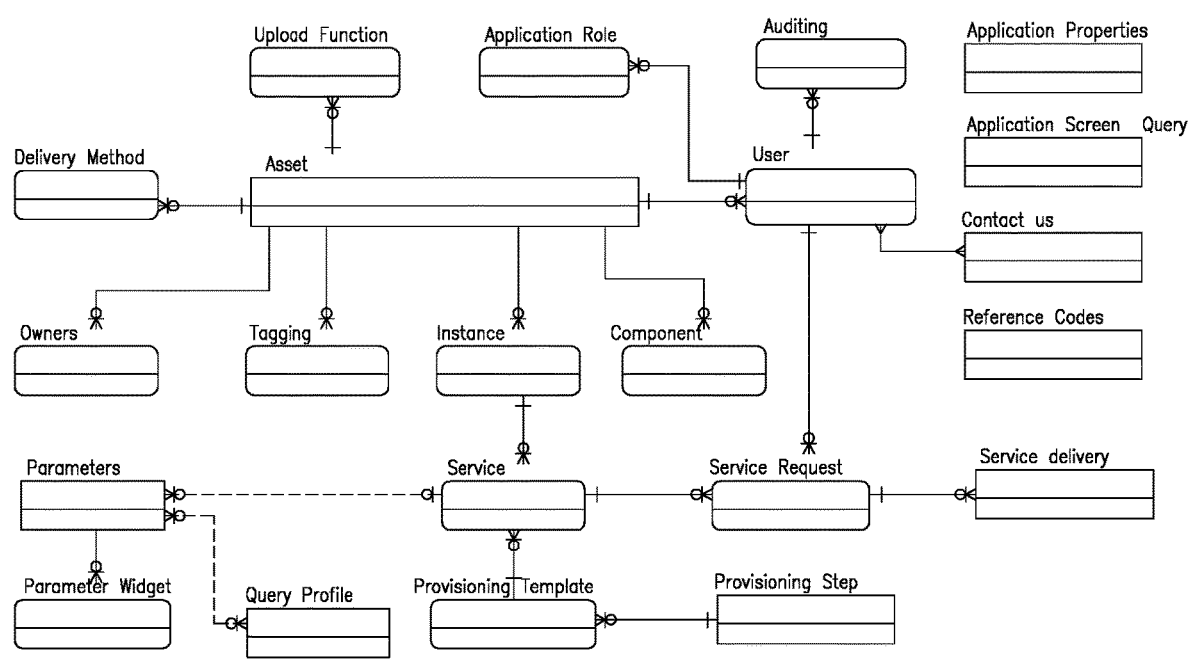
FIG. 3 shows a high level data model of the present invention.

FIG. 3 shows a high level data model and the relationships amongst some of the different components. Each data service in the marketplace is first registered as an "Asset." The asset is an atomic value, meaning the asset is the most granular level value of the data artifact such as: a document, a spreadsheet, an html page on a website, or the entire website (depending on the granular level desired), in data store 240, 290. In addition, all services created in the EDM have an association to that asset. Each asset has at least one Instance, and each Instance has at least one service. Meta data such as the name, description, the owner's preferences for user access, and connection details are stored for each asset. Additional attributes may be created and associated to an asset. These attributes are allowed by the application to be saved as any asset specific information that needs to be stored as meta data, such as source system variables, notes, cautions, etc. Data assets can exist anywhere and the setup includes connection details which can be a URL, file path, executable, SQL statement, function, etc. The platform also allows for the ability to categorize data assets and individual data attributes within an asset by data confidentiality/sensitivity (e.g. Confidential, Public, Personally Identifiable Information (PII), Health Insurance Portability and Accountability Act (HIPPA), etc.). Multiple owners may be assigned to an asset. One or more roles can be associated to the asset such as the data owner, the business EDM steward, special users, etc. The marketplace allows the flexibility to create specialized role names when needed and in turn, these roles are given specific permissions within the application to that asset.

Each asset should have one or more tags associated with it to identify its characteristics and provide the ability of users to search for an asset using keywords in its Tag list. There is a configurable tagging system to tag data assets in a customizable fashion with no software development. Maintenance of asset tags is done in an asset tag reference table where every asset can have multiple tags. There is a tag management screen that allows the EDM administrator to add or remove required tags. Once new tags are added through the tag management screen, the tags are readily available to be used to tag an asset. Providing the EDM administrator with the ability to add or delete tags via a tag management screen allows the system to be used in a customizable fashion without the need for additional software.

An asset is created into one or more "Instances." At a minimum, one instance has to be created for an asset which is called the "default" instance. However, the asset owner has the flexibility to create additional instances to provide subsets of the overall data available in the asset. The instances are used to represent different combinations of asset attributes to separate services out under the same data asset. For example, once instance of an asset can have a SSN as an attribute in the output, while another instance will have masked values of the SSN. Another example has one instance representing data from the User Acceptance Testing environment (UAT) and another instance representing data from the production environment (PROD). Although the instances belong to the same data asset, the underlying representation is different. Additional attributes may be created and associated to the instance. These attributes allow the application to save any instance-specific information that needs to be stored as meta data. Such information includes special handling, notes, etc.

Each asset also has one or more "Asset Components" associated with it. Components may be characteristics of the asset such as the data refresh frequency, the environment (production or non-production), and the encryption type where applicable. Components are also the data elements in the asset such as its name, description and status. Components can have one or more component attributes about them to describe their type, sample values list, and any other information deemed pertinent for that individual component. This application also provides the flexibility to the asset owner to create many types of attributes of the component. Furthermore, components can be assigned per instance as needed by the owner.

The "data service" is the functional/working component for the data asset and its instance, for example, ftp a file, download data, connect a URL and access the data. An instance of the assets can be associated to one or more services, however, a service cannot be associated to more than one instance/asset. A service within the asset/instance is considered unique based on the delivery of the information to the end-user and the format of the delivered data. The application code will determine the action to be taken based on the delivery and format of the service. In the marketplace, information delivery can be transient as well. The EDM application can serve as a pass-through to move data from a source to a certified target application such as self-service data analytics, visualization tools, and data integration tools.

Each service is "Provisional" so that the Owner and other entities have the ability to "Approve" the requestor based on the data being requested. The data store allows a list to be made and sets up individual authorization steps in the Data Provisioning Activity Template entity. The activity template is a grouping of the individual authorization steps (activities) in a specific chronological order, including owner approval, security approval, etc., The order is based on the provisioning/fulfillment steps as set by the EDM and is therefore considered a template for all similar future actions. The template activity is then grouped with the Provisioning Step system information before being associated with the service.

Templates have also been created to store information of the "Service Now" step in the provisioning system. Similar tables/templates can be created for other system steps as well. The data in these tables/templates is used strictly in the API call from the marketplace to the provisioning system in which the system takes approval from service approvers.

A user requests access to a particular data service in the marketplace application via a "Service Request." He or she adds the service to their cart and checks out the request. The request is then sent to a provisioning system whereby the data owner of the asset will approve or reject the request. The requestor access is pending access to that service until their submitted request is approved or denied. Requests made in the past for a particular service asset can be certified/affirmed by the owner of the asset to allow the service to be used in the EDM by the requesting user.

When a requestor runs a particular service, they have the ability to redirect the result of the run to their application inbox or choose to share the results. The ability to redirect the result set is dependent on the fact that when the asset is created in the marketplace, the asset allows service runs to be redirected to the Inbox. If this is not selected, then the option is not available at service run time. The requestor running the service can also choose to share the results with others in the organization. The EDM application has given the trusted choice to the requestor to share the resulting data. The ability to share a service is set at the asset when it is initially created.

Data assets can be data query services. The fields in those assets are listed as components and some of those components can be defined as parameter fields. These parameter fields can be a mandatory selection (a value must be selected), or an optional selection (the selection is not needed, get all values). The parameters are displayed at the service run-time when the requestor clicks on the "Run Service" button on the "My Data", "Approved" page. Furthermore, the Requestor can save their parameter selections to a Query Profile to save on data entry time when the service is run. The profile can be recalled at a later date and the same exact query will be run by the application to return a data set.

The "Service Parameter" screen is an interactive screen requesting input parameters for a data service in which the return results are dependent. The screen contains a list of parameter fields from the service. The widgets presented are the operators used to represent the input parameters. The input parameters, its field value and the widget operandi are stored in a data store. The data store provides flexibility to create new widget operators with their own set of values (if needed), and then reuse them across any service.

Figure 6:
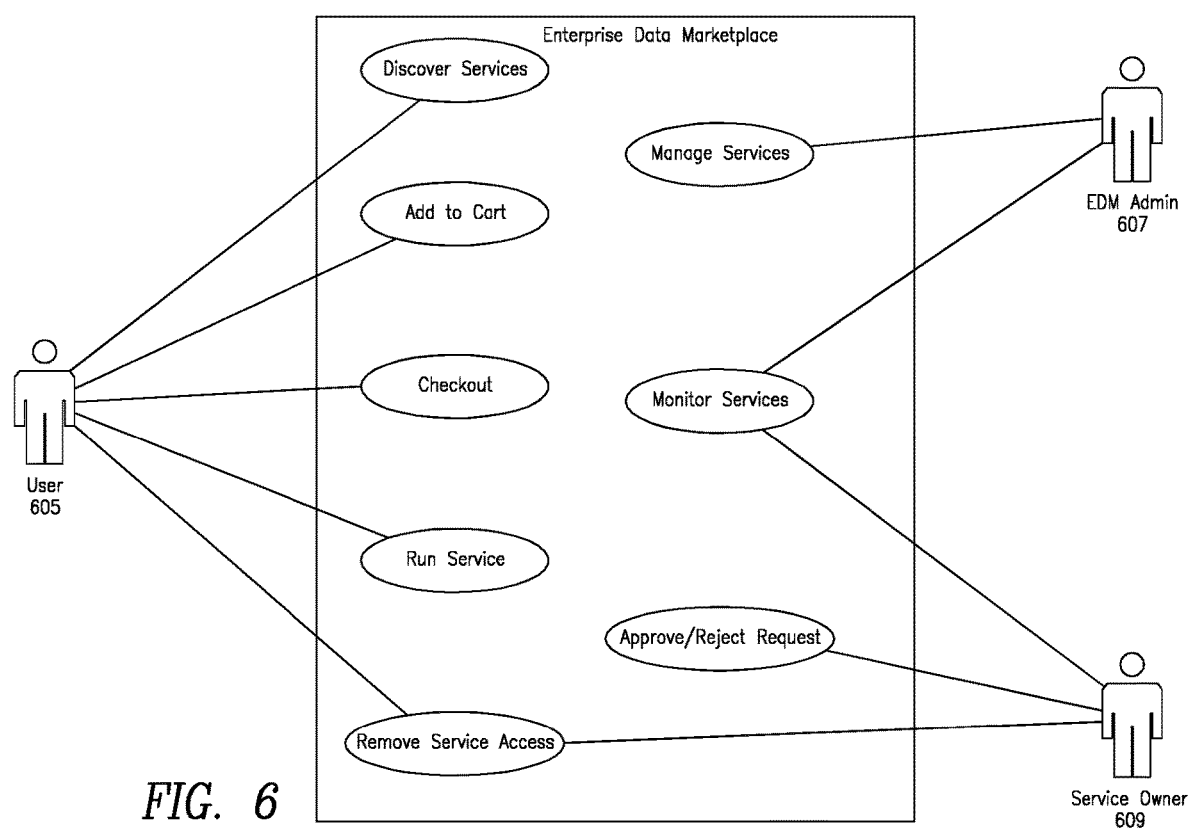
FIG. 6 shows a chart with the user types and their access provided.

Assets can be created to provide File Upload capability. As shown in FIG. 6, this functionality is tied to the asset rather than the service of the asset. The EDM application stores the file name and information about the target area, such as server, folder and output port, where the EDM application will upload the file to. The EDM application stores the history of the file uploads from the past.

User audit of the EDM captures a variety of events that occur across the EDM for each user. Information about the event, such as date and time of occurrence, the service acted on, the user's machine information (IP address, browser used, operating system), and the user's name. This information is kept in a single database table and the data collection is ongoing while the user is logged into the application.

The "Contact Us" option of this application allows the users the ability to contact the application team to point out issues, suggest new assets and their associated services to be added to the marketplace. Tagging information can be listed for new asset suggestions as well.

Administrative reports can be created based on SQL queries and hyperlinks can be assigned to one or more fields in that report query. Once created, the user can then view the results on the screen or download the results via an Excel file. The administrative reports are role based.

The application code configuration used is based on Java properties and the code configuration dictates the data values required. The data values are owned and maintained by the EDM application development team and are not used for any business purposes. The application team maintains the EDM properties in a database table such that it can be updated easily and reloaded.

The "Application Screen Query List" contains tables with a list of SQL Queries used by the EDM application in lieu of database views. This feature allows the application to have a faster turnaround for any SQL changes without having to depend on any database object changes. The SQL queries used by the EDM application are stored in a separate table that loads off of the application load time. This allows the developers to have a quick turnaround time to any SQL related bugs. This does not affect the user experience.

Figure 4:
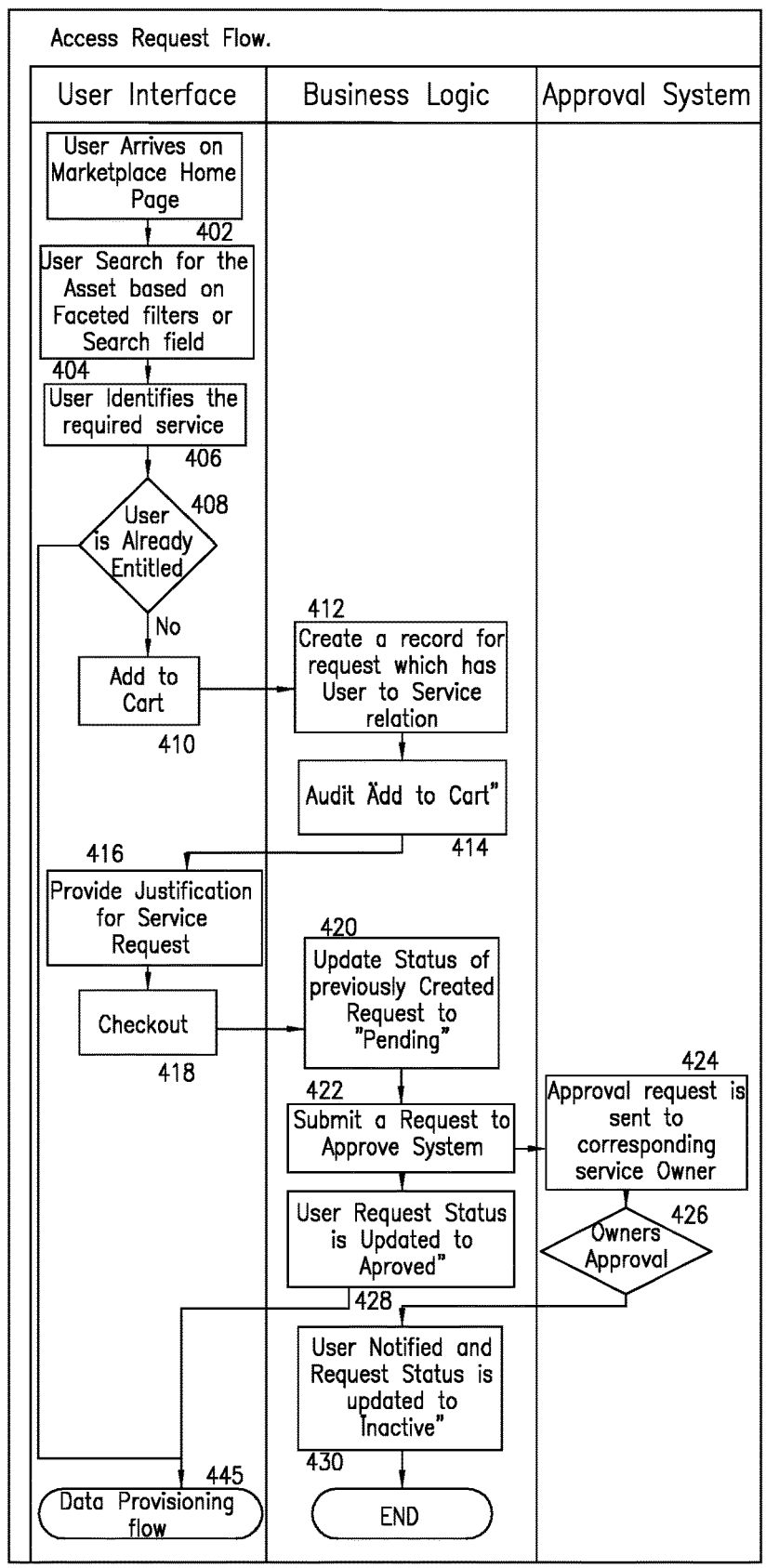
FIG. 4 shows a flow chart of the access request flow.

FIG. 4 provides an access request flow chart. To start, the user arrives on the marketplace homepage 402. The user searches 404 for an asset based on faceted filters or specific search fields. Once the user identifies a service 406 and make the proper request, it must be determined whether or not the user is already entitled 408 to access the service. If the user is entitled, the access request flow is completed and directed to the data provisioning flow 445. If the user is not already entitled, the user must add the service to their cart 410. Once the service is in the cart, a record is created for the request 412 having a user to service relation associated with it. "Add to Cart" is audited 414 by the system and justification 416 is requested on the user interface for the service request. Once justification is provided, the user checks out 418. The status of the previously created request is updated 420 to "Pending." The request is submitted to the approval system 422. The approval request is submitted to the corresponding service owner 424. If the owner approves the request 426, the user request status is updated to "Approved," and proceeds to the data provisioning flow 445. If the owner does not approve the request the user is notified, the request status is updated to "Inactive" 430, and the access request flow ends.

Figure 5:
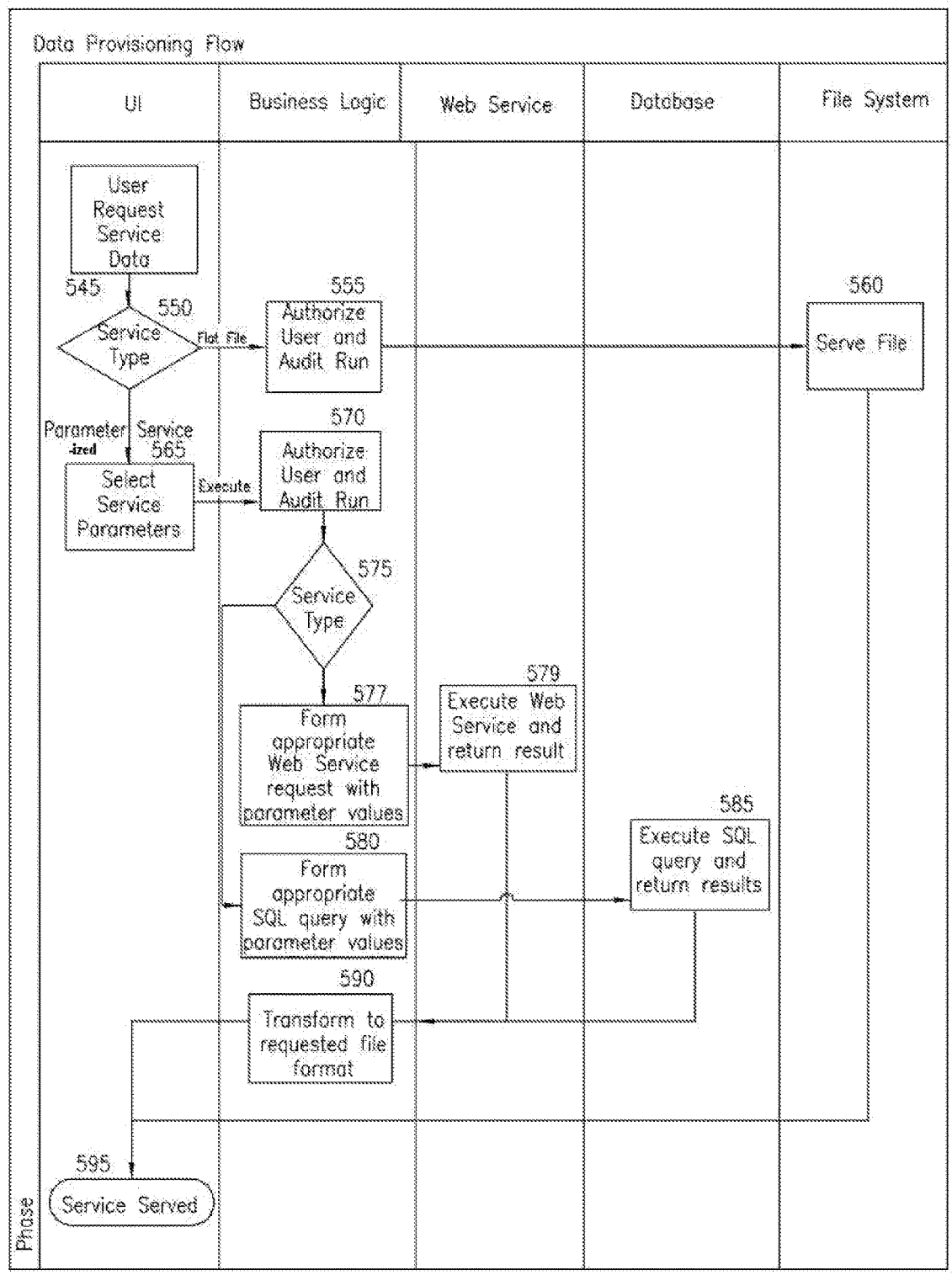
FIG. 5 shows a flow chart of the data provisioning flow.

FIG. 5 shows a flow chart for the data provisioning flow. To start, the user requests service data 545. Next, the service type is determined 550. If the service is a flat file, the user is authorized, a run is audited 555 and the file is served 560. If the service is a parameterized service, the service parameters must be selected 565. This is executed and the user is authorized and an audit is run 570. The service type is determined between a web service request 577 and SQL Query 580. With a web service, an appropriate web service request must be prepared including the parameter values 577. The web service is executed and results are returned 579. The requested file is transformed into the requested format 590 and the service is served 595. Using a SQL Query appropriately formed with parameter values 580, a SQL query is executed and the results are returned 585. The requested file is transformed into the requested format 590 and the service is served 595.

FIG. 6 is an embodiment of the services provided in the marketplace and the access the different owners have to the services. Business users 605 have access to services including discovery, "Add to cart," "Checkout," "Run service," and "Remove service access." EDM administrators 607 have the ability to manage and monitor services. Service Owners 609 have the ability to monitor services, approve/reject service requests and remove service access. The service owner may further restrict access to the service, even after the owner has approved access. Therefore, the service owner is able to continuously review those with access and the service owner has the ability to change their mind, if desired, and pull the access from the user that was previously approved. The system tracks who is viewing the data services. The business user, administrator and service owner can each see who and what is being viewed by others.

The Data Marketplace allows users of the system to search for data assets via any combination of string searches and tag value combinations. This search is able to search all of the meta data and even the data accessible via the data asset.

Figure 7:
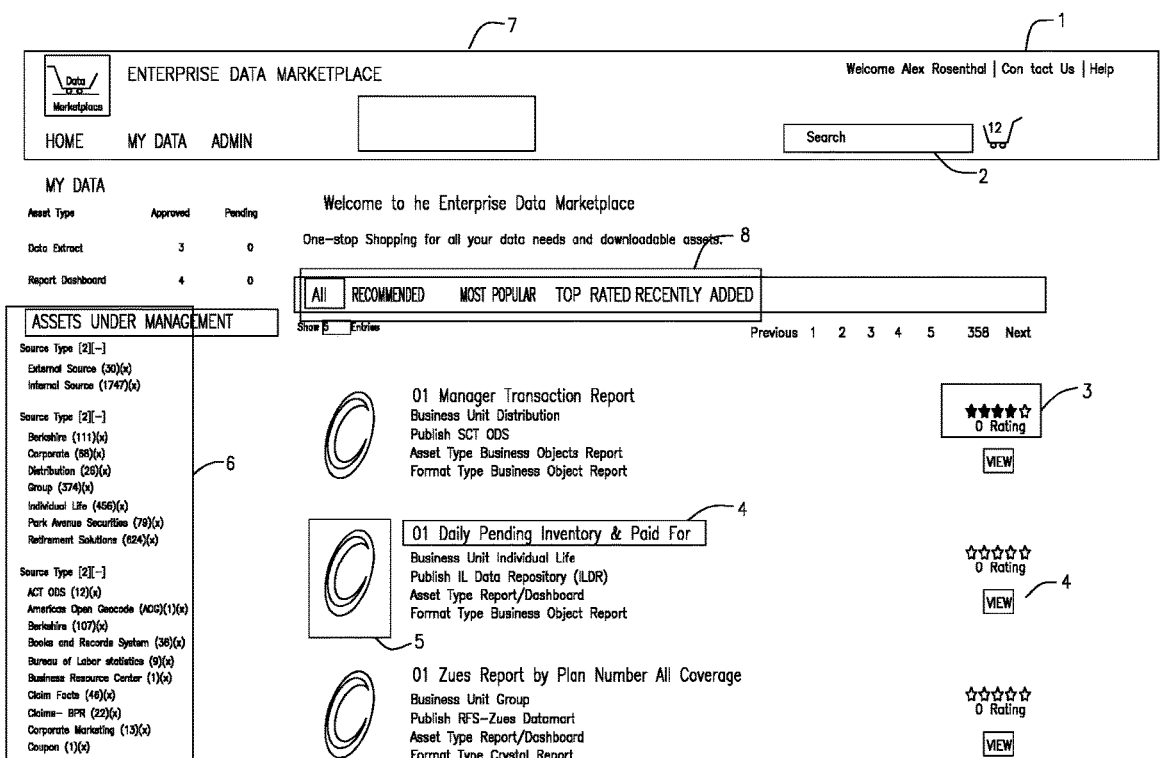
FIG. 7 shows a screen shot of the "Home Page" of the present invention.

FIG. 7 shows an example of the "Home Page" of the present invention in the front end portal viewed by the user.

The "Home Page" provides the user with access to various information including a shopping cart 1, a search query bar 2, ratings/reviews 3, links 4, custom images 5, tagging capabilities 6, a summary 7 and a tab 8. Shopping cart 1 provides the user with ability to check-out data assets. The search query bar 2 provides the user with the ability to perform a search through all the data and meta data. Rating/reviews 3 are provided for the data assets and allow the community/users to provide and share feedback regarding the usefulness of the data asset. Links 4 allow the user to drill down into a further detailed view of the data asset. Image 5 allows the user to easily distinguish between different publisher source systems. Tagging 6 provides searchable custom tagging capabilities to profile data assets. Summary 7 provides a summary of the data assets entitled to the user. Tab 8 is a sub tab of the search queue to show data assets to the user.

There are pre-configured searches including: "Most Popular", "Most Utilized," "Recommended for Me." And "Recently Added." The "Most Popular" search is determined by the measurement of entitled users/applications. The "Most Utilized" search is determined by measurement of user/application usage patterns. The "Recommended for Me" search is determined by profiling users accessing the system and recommending data assets that are related to data assets they have searched for, viewed, or accessed. It also includes profiling off of user characteristics, such as department, geographical location, etc., for example. The "Recently Added" search displays data assets that were most recently published on the data marketplace for searching or consumption.

In addition to the pre-configured searches, the platform allows for other configured search queues to be created at a user level, regional level (the work area network) or platform level.

FIG. 8 shows a screen shot of the "Data Asset Detail" Screen. This screen includes shopping cart 2, display 12 and button 14. Shopping cart 2 provides the user with the ability to add the data asset to the shopping cart for checkout. Display 12 provides a display of other data assets that may be of interest to the user based on the current data asset being viewed. Button 14 allows the user to access the data dictionary details for a data asset. The data dictionary lists the attributes of the data asset.

Figure 9:
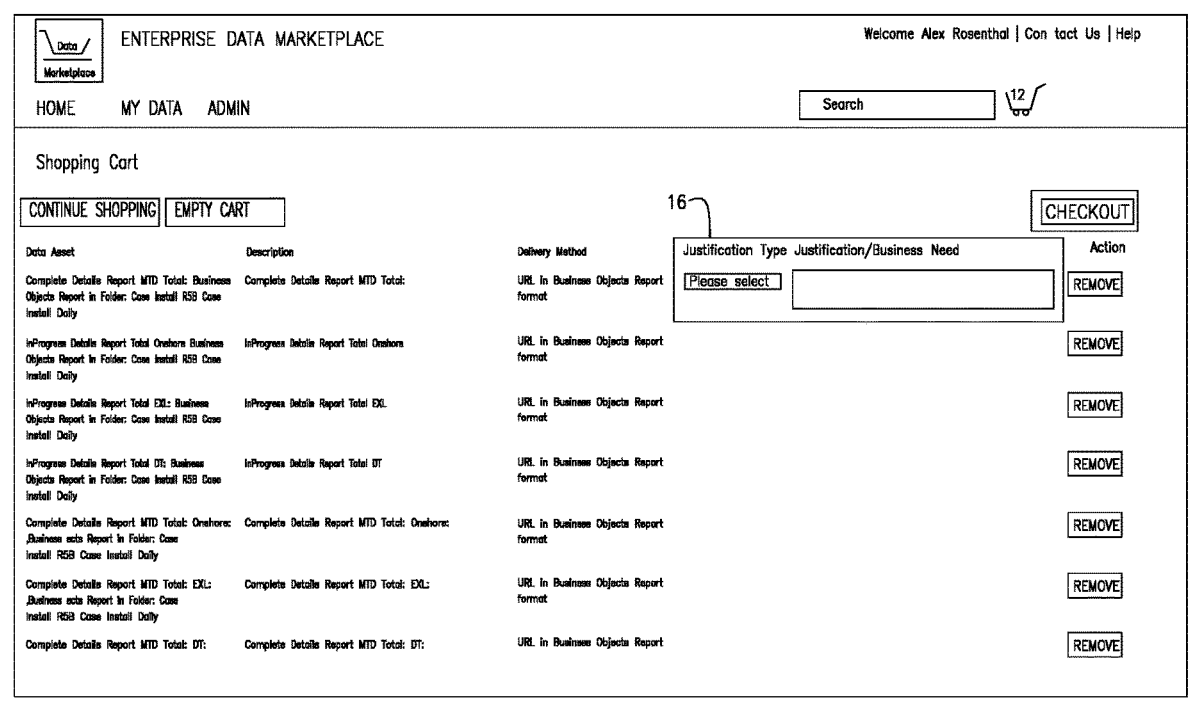

FIG. 9 shows a screen shot of the "Shopping Cart" screen that includes prompt 16. Prompt 16 prompts the user to justify the need for the data asset they are requesting in order to request authorization.

Figure 10:
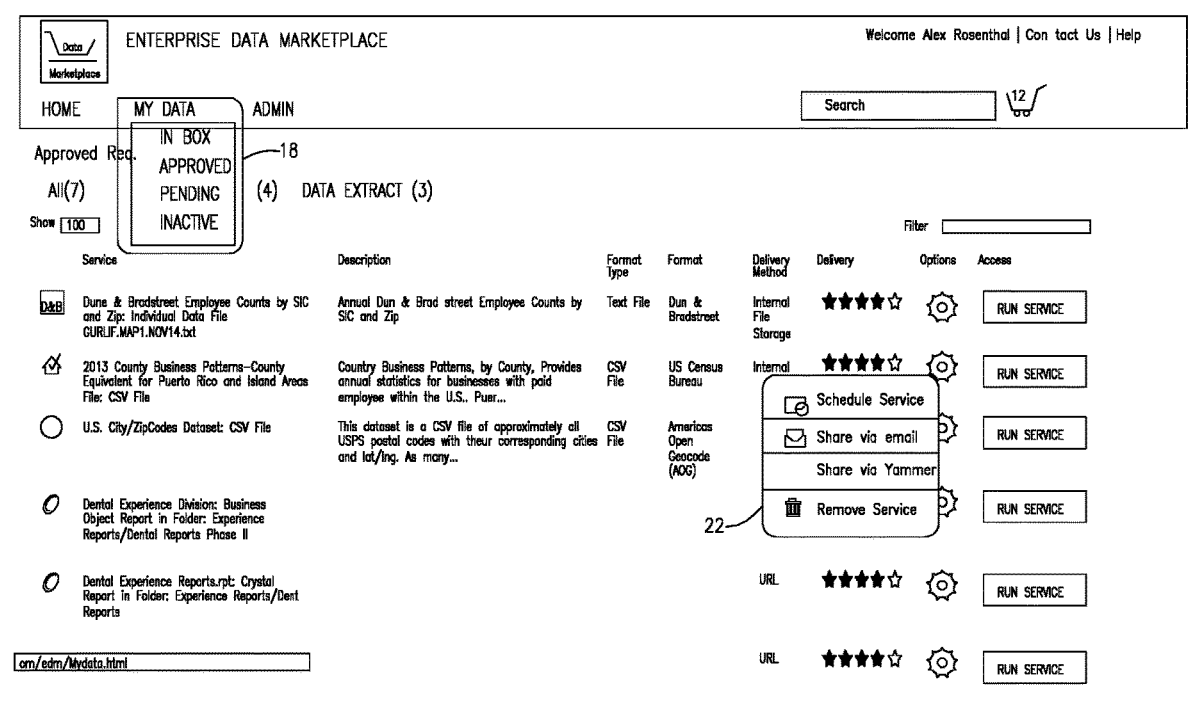

FIG. 10 shows a screenshot of the "My Data Section" screen. This screen in the data marketplace includes a dropdown menu 18 allowing the user to view their "In Box," "Approved Data Asset," "Pending Data Assets," "Rejected Data Assets," and "Inactive Data Assets." The "In Box" is where data asset results can be delivered to, by, or for a user. The "Approved Data Asset" is a central listing of all data assets a user is entitled to access/execute. This is important as it becomes the one stop location for all data assets a person or application resource can go to perform their daily functions. The "Pending Data Assets" displays all data assets that have been requested/checked-out by a user, but not yet fully approved within the approval process. The "Rejected Data Assets" displays all data assets that have been requested/checked-out by a user, but was rejected within the approval process. The "Inactive Data Assets" displays all data assets that were deleted by the user after they were entitled to them. This can also include data assets where the user's data access rights have expired. Other functionality provided include menu 22 which allows the user to schedule a data asset to run, share the details about a data asset with others via email, Yammer or other social media communication, or remove the service when it is no longer needed. The user is also able to run the service immediately.

Figure 11:
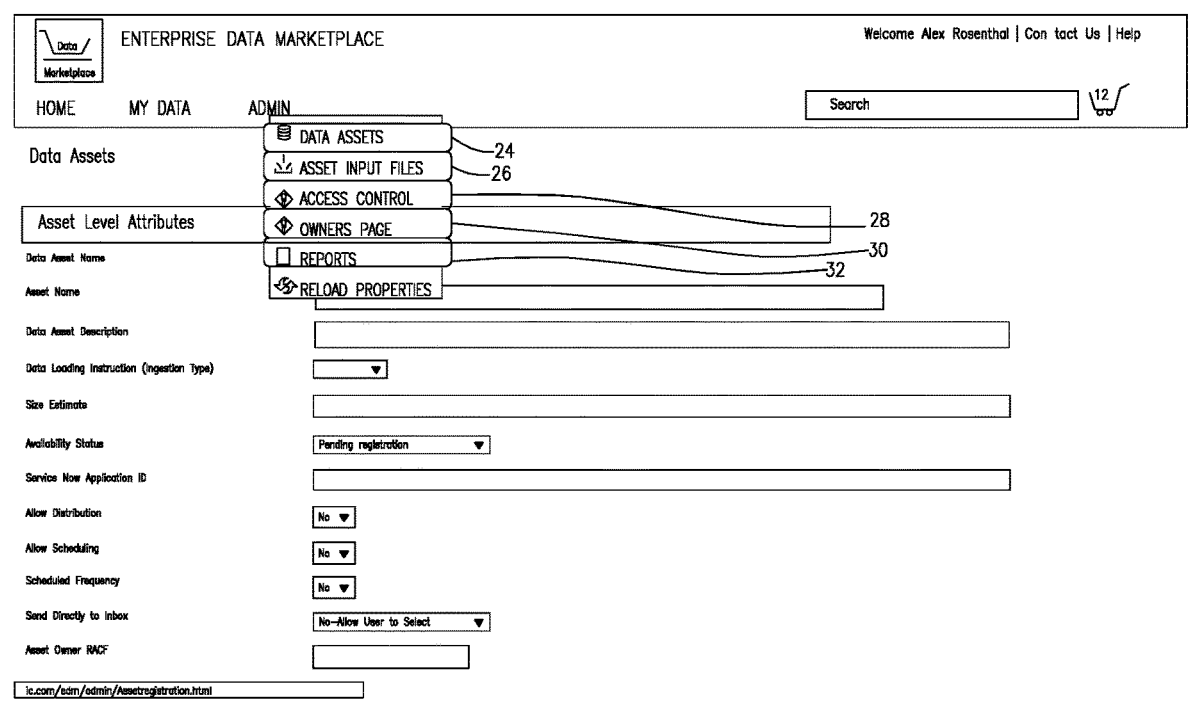

There are administrative related screens and features which include: "Data Asset Admin," and the "Owner" Screen. FIG. 11 shows a screen shot of the administrative section screen, "Data Asset Admin," where data assets are created, updated and deleted. This includes the meta data and even the underlying data asset. For example, where the asset is a file that has been uploaded for consumption by others. The "Owner" screen allows the owner of data assets to actively monitor and manage the usage and entitlements of data assets. This includes an attestation workflow that monitors the information for all users that have been allowed access to the owner's service. Included in the administrative menu are headers for assets 24, inputting files 26, access control 28, an owners page 30 and reports 32. Assets 24 allow administrative entitled users to create new data assets manually. This can also read the meta data from other tools to register assets as well, for example, business objects. Input files 26 provides the ability for an entitled user to upload data assets or driver files for data assets to run. Access control 28 provides the ability to manage entitlements as an administrator. Owners page 30 provides the ability for owners of data assets to manage their data assets meta data setup and entitlements and support attestation requirements. Reports 32 provides the ability to create and run canned and ad hoc reports to administer the platform.

The sharing of data assets within the Data Marketplace can be done for the corresponding meta data or the actual results of a data asset. This sharing can be done via the platform's internal notifications, email, text message and/or social network.

The checking out of a data assets includes the adding of assets to a shopping cart. Data assets can be free or can be charged for. The cost can be time based, execution based, data size based, etc. The check-out approval process can be configurable at a service level to reflect the cost or the sensitivity of the data/functionality of the data asset. For example, if a data asset has HIPPA or PII data, the checkout and approval process require the approval of many individuals such as a person's manager, the data asset owner, compliance and legal officers, etc.

The accessing and execution of data assets can either be via the data marketplace interface or directly to the data asset itself. The data marketplace manages entitlements and can share these entitlements with other systems. The data marketplace can also access external authorization/authentication systems (e.g. LDAP, etc.). Depending on the type of data asset, the data marketplace can be the owner/host of a data asset or it can be a pass through to data assets where they reside. For example, a data asset can be a full blown function managed by the platform or it can be as simple as a URL link to a $3^{rd}$ party web site.

Data assets can be scheduled to be executed by a user or by a central administrator. This includes the setup of a schedule by time or by a data condition. The schedule can include the designation of different data distribution methods such as, Data Marketplace Inbox, email, ftp, etc. It can also be distributed to zero, one or many recipients.

Data assets can be scored and commented on by users in order to provide a community and socialization around the usage, quality, etc. of the data assets. This allows for a better actively managed experience for users determining what assets are useful or not. Users who navigate the data marketplace can also see who the owner of a data asset is and be able to contact them for more information. There is also the ability to see what other users have access to the data asset and when they last accessed the asset.

The Data Marketplace can be hosted within a single network or can be deployed to cloud platform environments. The install can be specific to one or a grouping of people and/or organizations. It can be available as a public or private platform for the sharing and distribution of data assets.

Although the present invention has been described in conjunction with specific embodiments, those of ordinary skill in the art will appreciate the modifications and variations that can be made without departing from the scope and the spirit of the present invention.

The invention claimed is:

1. A method for managing data assets via a networked system comprising:
    managing first party and third party data assets on a single platform;
    authorizing access by a user to a user graphical interface layer using a single sign on browser request, wherein a user ID is checked against an organization's directory;
    determining whether the user is an administrative user, an end user or a data asset owner user, wherein the user graphical interface layer will be provided based on a user type;
    opening the user graphical interface for the user, wherein the graphical interface varies depending on whether the user is the administrative user, end user or data asset owner user;
    registering data assets by the administrative user, wherein the registering of the data assets includes registering tag services and meta data of the data assets;
    storing all catalog information of all data services available in a meta database, wherein the data services comprise the data assets, instances, services in the system and service related attributes; wherein the data assets are continuously read and updated on the meta database and only the administrative user has permission to catalog and access the create and update capabilities of the data services of the meta database;
    maintaining ownership responsibility of each data asset by one or more data asset owner users;
    providing the end user self-service access to browse or search a directory of a database that holds all of the catalog information of all of the data assets available in a data store on the single platform;
    receiving from the end user a selection and order of one or more data assets, wherein the end user selects and orders a data asset by adding one or more selected data assets to a cart;
    creating a record for request associating an end user relation to the one or more selected data assets;
    auditing the one or more selected data assets in the cart and requesting the end user provide justification for the request for access to the one or more selected data assets in the cart via a prompt;
    receiving the justification from the end user for the request for access to the one or more selected data assets and receiving from the end user a request to check out the cart;
    rendering, based on receiving the justification and checkout request from the end user, the record for request into a pending status, wherein a request for permission is submitted to a data asset owner user for approval or rejection;
    determining whether the data asset owner user approves or rejects the end user's request,
        wherein when the data asset owner user approves the permission request, the record for request changes from the pending status to an approved status, and
        wherein when the data asset owner user rejects the permission request, the record for request changes from the pending status to an inactive status, the end user is notified of the rejection and the end user is not allowed access to the selected data asset;
    determining the data asset owner user approves the permission request;
    upon determining that the data asset owner user approves the permission request:
        changing the record for request from the pending status to an approved status;
        processing the request for delivery to the end user, the end user selecting and requesting the format of the data asset to be delivered;
        fetching the data asset from a trusted information store;
        transforming the data asset into the requested format; and
        delivering the data asset to the end user.

2. The method as recited in claim 1, further comprising upon determining that the data asset owner user approves the permission request, charging for the access and delivery of the delivered data assets.

3. The method as recited in claim 1, further comprising upon determining that the data asset owner user approves the permission request, scheduling delivery of the approved selected data assets, wherein the scheduling includes a setup for delivery by time or by a data condition.

4. The method as recited in claim 1, further comprising providing that the administrative user categorizes the data assets.

5. The method as recited in claim 1, further comprising upon determining that the data asset owner user approves the permission request, providing that the end user scores the delivered data assets.

6. The method as recited in claim 1, further comprising upon determining that the data asset owner user approves the permission request, providing that the end user can provide comments on the delivered data assets.

7. The method as recited in claim 1, wherein upon determining that the data asset owner user approves the permission request, the authorization of delivery includes accessing external authorization/authentication systems.

8. The method as recited in claim 1, wherein upon determining that the data asset owner user approves the permission request, the authorization of the delivery maintains regulatory requirements of first party proprietary data assets when providing data asset authorization.

9. The method as recited in claim 1, wherein upon determining that the data asset owner user approves the permission request, further determining that the data asset owner user has reversed the data asset owner user approval of the end user's request and notifying the end user of the reversal and denying the end user further access to the selected data asset.

10. The method as recited in claim 1, further comprising upon determining that the data asset owner user approves the permission request, tracking the delivered data assets viewed, and providing access to the tracking to the end user, the administrative user and the data asset owner user.

11. The method as recited in claim 1, wherein the first party data is proprietary data used internally within an organization and the third-party data is data provided by a third party.

12. The method as recited in claim 1, further providing that the end user searches using filters or search fields.

13. The method as recited in claim 1, wherein there are multiple data asset owners for a data asset and each data asset owner user must approve the end user's request in order for the record for request to change from the pending status to an approved status.

14. The method as recited in claim 1, wherein upon determining that the data asset owner user approves the permission request, the data asset fetched from the trusted information store is raw data that is transformed into the end user's requested format.

15. The method as recited in claim 1, wherein the managed data assets via the networked system are for insurance services.

16. The method as recited in claim 1, wherein cataloging the data assets includes categorizing the data assets and individual data attributes within a data asset by a data confidentiality/sensitivity.

17. The method as recited in claim 16, wherein the data confidentiality/sensitivity includes a confidential attribute, a public attribute, Personally Identifiable Information (PII) attribute, or Health Insurance Portability and Accountability Act (HIPPA) attribute.

18. The method as recited in claim 1, further comprising an enhanced checkout and approval process for selected data assets in the cart having Personally Identifiable Information (PII) or information governed by the Health Insurance Portability and Accountability Act (HIPPA) that mandates the approval of a plurality of individuals.

19. The method as recited in claim 1, further providing that the data asset owner user administers their data assets on an owner's page within the single platform.

20. The method as recited in claim 19, further providing that the owner's page includes the ability to create and run reports regarding the data assets of the data asset owner user.

* * * * *